UNITED STATES PATENT OFFICE.

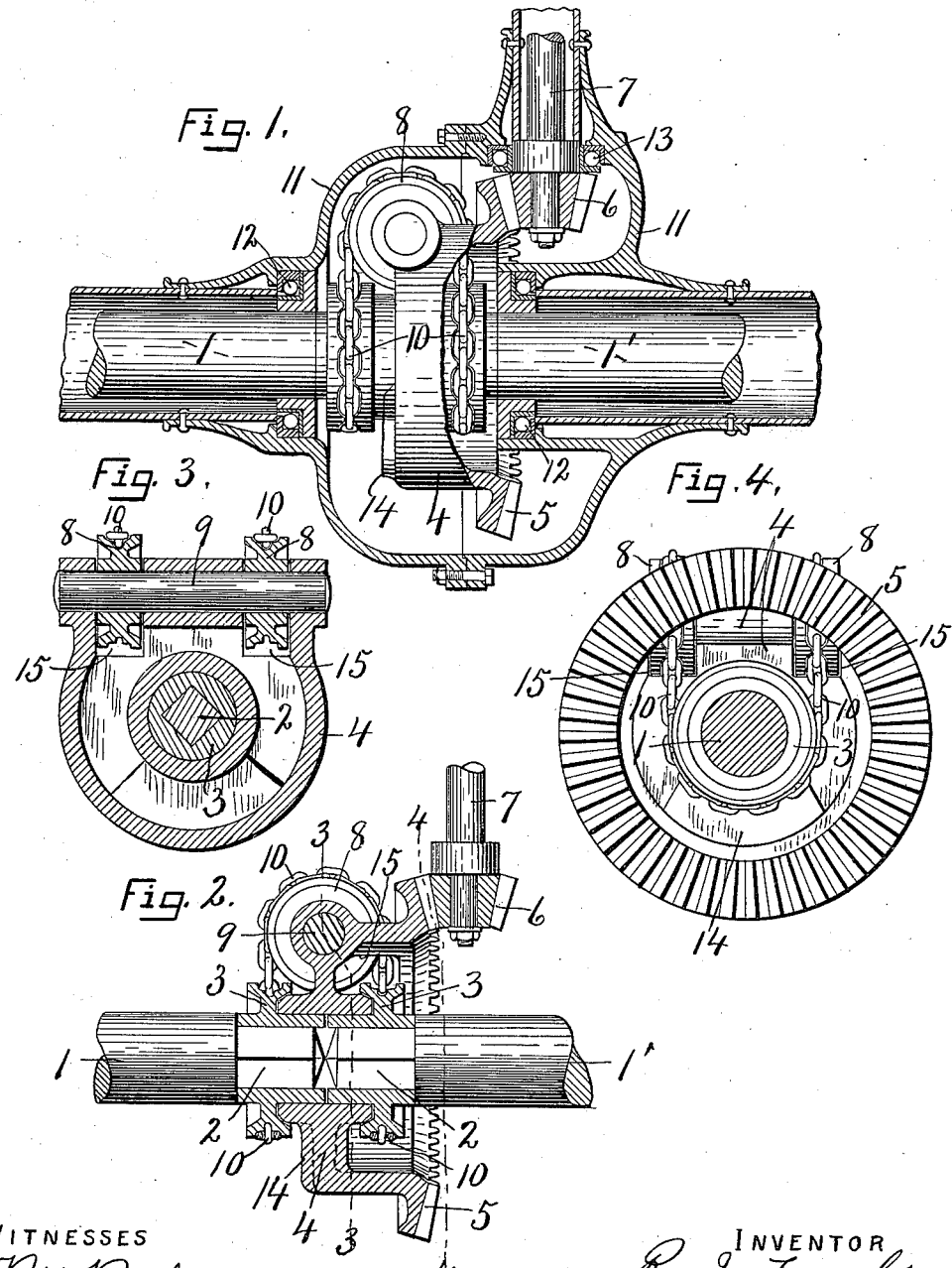

ROSMAN I. FANCHER, OF BALDWINSVILLE, NEW YORK, ASSIGNOR OF ONE-HALF TO FRANK L. FULLER, OF SYRACUSE, NEW YORK.

DIFFERENTIAL GEAR FOR AUTOMOBILES.

1,028,009.  Specification of Letters Patent.  Patented May 28, 1912.

Application filed April 20, 1910. Serial No. 556,581.

*To all whom it may concern:*

Be it known that I, ROSMAN I. FANCHER, of Baldwinsville, in the county of Onondaga, in the State of New York, have invented new and useful Improvements in Differential Gear for Automobiles, of which the following, taken in connection with the accompanying drawings, is a full, clear, and exact description.

This invention relates to certain improvements in differential gears for automobiles to compensate for the differential speeds of the axle sections when the machine is deflected from a straight course as in turning corners.

I am aware that it is common to provide the meeting ends of axle sections with similar beveled gears meshing with one or more interposed pinions or idlers which are revolubly mounted in a suitable yoke or casing to which rotary motion is imparted from the main driving shaft through the medium of intermeshing gears thereby rotating the axle sections. The number of teeth in mesh between the axle gears and interposed pinions is comparatively small, usually not exceeding two or three which take the entire thrust or strain incidental to the operation of the axles and it frequently happens that a sudden increase or diminution in the speed of one or the other of the wheels, as for example in passing over an obstruction or depression in the pavement, will cause the stripping or mutilation of such teeth which of course makes it necessary to replace the mutilated gear or gears with new ones. Furthermore the gear which is secured to the yoke is necessarily of large diameter which requires the use of a gear case considerably larger than the diameter of the yoke and consequently requires that the chassis or body of the machine be elevated a sufficient distance above it to prevent contact with said gear case under the action of the body supporting springs.

The main object is to obviate the use of the usual axle gears and interposed pinions and consequent breakage, expense and inconvenience resulting from such use and at the same time to establish a more durable, positive and efficient connection between the main driving shaft and axle sections by employing a corparatively short endless chain and suitable sprocket wheels associated in such manner as to establish a more continuous, uniform and greater circumferential contact of the power transmitting medium around the axle sections than would be possible with the usual gears. In other words I have sought to provide a simple, compact and economic compensating mechanism which will be more efficient, more easily responsive and more durable than toothed gears employed for the same purpose.

Another object is to assemble the parts in such manner as to permit the use of a gear case of comparatively small diameter, thereby leaving a greater clearance for the vertical action of the body or chassis than has heretofore been practicable.

Another object is to establish comparatively long bearings between the sprocket wheels and adjacent ends of the axle sections to which they are locked by extending the hubs of the sprocket wheels through a central aperture in the yoke, thereby forming comparatively long journal bearings between the yoke and sprocket wheels.

Other objects and uses relating to specific parts of the device will be brought out in the following description.

In the drawings: Figure 1 is a top plan partly in section of my improved compensating gearing showing the outer gear case in section and also showing portions of the main driving shaft and axle sections. Fig. 2 is a horizontal sectional view of the same compensating gearing shown in Fig. 1, the gear case being omitted. Figs. 3 and 4 are transverse sectional views taken respectively on lines 3—3, and 4—4, Fig. 2, as the latter would appear in elevation.

In illustrating the operation of my invention, I have shown separate coaxial axle sections —1— and —1'— arranged end to end in the usual manner and having their ends reduced at —2— and angular or square in cross section. Mounted upon the inner angular ends of the shaft sections —1— and —1'— are separate sprocket wheels —3— having central openings which are also angular in cross section and closely fitted upon the angular sections —2— to rotate therewith. The hubs of the sprocket wheels are elongated to the full length of the reduced portions —2— with their inner ends in close proximity, so as to afford as long bearings therefor as possible. The face width of the peripheries or chain engaging portions of the sprocket wheels —3— is considerably less than the length of their respective hubs, such face portions being spaced some distance apart for receiving between them a yoke —4— having a central opening in which the adjacent ends of the hubs of the sprocket wheels are journaled for independent rotation with their respective axle sections —1— and —1'—. The yoke —4— is provided in one end (preferably the right hand end) with a beveled gear —5— which meshes with a beveled pinion —6— on a main driving shaft —7—, the latter being adapted to be connected to the engine shaft, not necessary to herein illustrate or describe.

Journaled upon the yoke —4— at one side of and at right angles to the axle sections —1— and —1'— is a pair of sprocket wheels —8— which in this instance are mounted coaxially upon a transverse shaft or spindle —9— in planes tangential to diametrically opposite sides of the sprocket wheels —3—, the latter being also disposed in planes tangential to diametrically opposite sides of the sprocket wheels —8—. In other words, the diameter of the sprocket wheels —8— and distance between the sprocket wheels —3—, from center to center, are substantially the same, while the diameter of the sprocket wheels —3— is substantially the same as the distance from center to center of the sprocket wheels —8—.

An endless chain —10— is passed around and engaged with the peripheries of the sprocket wheels —3— and —8—, opposite sides of the chain being substantially parallel, so that when rotary motion is imparted to one axle section in one direction, as in turning corners, opposite rotary motion will be imparted to the other axle section.

Rotary motion is imparted to the yoke —4— through the medium of the pinion —6— and gear —5— by which motion the sprocket wheels —8— are moved bodily and axially around the axis of the axle sections —1— and —1'—, the chain —10— which laps upon substantially half the circumference of each of the sprocket wheels serving as a means for rotating the sprocket wheels —3— and axle sections —1— and —1'— connected thereto.

It is apparent that when the machine is driven straight away or in a direct course, the strain upon the chain operating to rotate the axle sections is evenly distributed or equal at all points and owing to the fact that it has a continuous lap or contact throughout at least half the circumference of the sprocket wheels —3— the liability of stripping or in any way mutilating the sprockets is reduced to a minimum and at the same time the chain is quickly responsive to any slight variation or difference of speed in the two axle sections.

The peripheries of the sprocket wheels are made to conform to the links of the chain, thereby forming a series of depressions and projections alternating with each other to receive said links which produce a positive transmission of motion from one to the other of the sprockets and prevents in a measure the straining of the chain owing to the fact that most of its links are in constant engagement with the sprockets of the wheels.

The entire compensating gearing is inclosed within a suitable gear case —11— having anti-friction bearings —12— for supporting the axle sections —1— and additional anti-friction bearings —13— for supporting the inner end of the driving shaft —7—. The eccentric weight of the sprocket wheels —8— and its supporting shaft —9— is counterbalanced by an opposite counterweight —14— forming a part of the yoke —4—, as best seen in Figs. 2 and 4.

It will be observed that the radius of the gear —5— is substantially equal to the distance from the axis of the axle section —1— to the outside of the sprocket wheels —8— so as to reduce the diameter of the gear as much as possible and thereby permit the use of a comparatively small gear case —11—.

The sprocket wheels —8— and portions of the chain —10— travel in suitable openings —15— in the adjacent portions of the yoke to permit the action of the chain without friction with said yoke.

Another important feature of advantage in the use of this particular form of compensating gearing is that it obviates the outward end thrust of the axle sections in their bearings produced by the interposition of pinions between the axle gears of the usual differential gearing thereby relieving the axle bearings from end thrust strains and at the same time increasing the efficiency and longevity of such bearings. Another important feature of this invention is that it is practically noiseless and reduces the lost motion or back-lash to a minimum.

The operation of my invention will now be readily understood upon reference to the foregoing description and the accompanying drawings and it is evident that some detail changes may be made without departing from the spirit of my invention.

What I claim is:

A differential gear for automobiles comprising coaxial axle sections arranged end to end and having their adjacent ends angular in cross section, separate sprocket wheels mounted on an angular portion of their respective shaft sections to rotate therewith and having the adjacent ends of their hubs extended toward each other and cylindrical in cross section to form annular bearings, a cup-shape yoke having its base provided with a hub journaled on said bearings between the sprocket wheels, the open end of the yoke being provided with a bevel gear, a journal bearing on the yoke at right angles to and some distance to one side of the axis of the shaft section midway between the sprocket wheels and at the angle of the base with the sides of the yoke, an additional pair of sprocket wheels mounted on said journal bearing and of substantially the same diameters as the distance between the centers of the first named sprocket wheels, an endless chain passing around said sprocket wheels, and a driving shaft having a pinion meshing with the gear.

In witness whereof I have hereunto set my hand on this 16th day of April 1910.

ROSMAN I. FANCHER.

Witnesses:
H. E. CHASE,
A. L. HUMPHREY.